(12) United States Patent
Hu et al.

(10) Patent No.: US 11,949,282 B2
(45) Date of Patent: Apr. 2, 2024

(54) OFFLINE UNINTERRUPTIBLE POWER SOURCE AND CONTROL METHOD THEREFOR

(71) Applicant: LIAN ZHENG ELECTRONICS (SHENZHEN) CO., LTD., Shenzhen (CN)

(72) Inventors: Wuhua Hu, Shenzhen (CN); Liang Deng, Shenzhen (CN)

(73) Assignee: Lian Zheng Electronics (Shenzhen) Co., Ltd., Shenzhen (CN)

(*) Notice: Subject to any disclaimer, the term of this patent is extended or adjusted under 35 U.S.C. 154(b) by 217 days.

(21) Appl. No.: 17/613,803

(22) PCT Filed: May 21, 2020

(86) PCT No.: PCT/CN2020/091458
§ 371 (c)(1),
(2) Date: Nov. 23, 2021

(87) PCT Pub. No.: WO2020/238735
PCT Pub. Date: Dec. 3, 2020

(65) Prior Publication Data
US 2022/0231535 A1 Jul. 21, 2022

(30) Foreign Application Priority Data
May 24, 2019 (CN) .......................... 201910439590.0

(51) Int. Cl.
*H02J 9/06* (2006.01)
*H02J 7/00* (2006.01)
*H02J 7/02* (2016.01)

(52) U.S. Cl.
CPC ............ *H02J 9/062* (2013.01); *H02J 7/0029* (2013.01); *H02J 7/0049* (2020.01); *H02J 7/02* (2013.01); *H02J 2207/20* (2020.01)

(58) Field of Classification Search
CPC ...... H02J 9/00; H02J 9/062; H02J 7/02; H02J 7/0029; H02J 9/068
See application file for complete search history.

(56) References Cited

U.S. PATENT DOCUMENTS 8,212,402 B2 * 7/2012 Rodenhiser ............. H02J 9/062
307/64
10,411,502 B2 * 9/2019 Hu ............................ H02J 9/04
(Continued)

FOREIGN PATENT DOCUMENTS

CN 101976871 A 2/2011
CN 202026129 U 11/2011
(Continued)

OTHER PUBLICATIONS

China National Intellectual Property Administration, Search Report, CN2019104395900, dated Jun. 15, 2020.
(Continued)

*Primary Examiner* — Hal Kaplan
*Assistant Examiner* — Rasem Mourad
(74) *Attorney, Agent, or Firm* — Stanek Lemon Crouse & Meeks, PA

(57) ABSTRACT

Disclosed are an offline uninterruptible power source and a control method therefor. The offline uninterruptible power source comprises: a safety switch (22) connected between an alternating-current input end (20) and an alternating-current output end (20'); a transformer (Tr2), wherein one end of a primary side thereof is connected to one terminal of the alternating-current output end (20'); a first switch (231), a second switch (232) and an output switch (24), which are successively connected between the safety switch (22) and the other terminal of the alternating-current output end (20'), wherein the first switch (231) is operable such that the safety switch (22) is connected to either of the other end or a tap of the primary side of the transformer (Tr2), and the second switch (232) is operable such that the output switch (24) is connected to either of the other end or the tap of the primary side of the transformer (Tr2); a third switch (29), which is operable such that the safety switch (22) is connected to either of the first switch (231) or the other terminal of the alternating-current output end (20'); and a bidirectional (Continued)

converter (25). The offline uninterruptible power source has high electric energy transmission efficiency.

13 Claims, 4 Drawing Sheets

(56) References Cited

U.S. PATENT DOCUMENTS

| | | | |
|---|---|---|---|
| 2006/0238031 A1* | 10/2006 | Frey | H02J 9/062 |
| | | | 307/64 |
| 2010/0259222 A1* | 10/2010 | Senriuchi | H01M 50/574 |
| | | | 320/136 |
| 2016/0226304 A1 | 8/2016 | Castro | |
| 2019/0064274 A1* | 2/2019 | Fu | G01R 31/3828 |
| 2020/0006979 A1* | 1/2020 | Lin | H01H 47/002 |

FOREIGN PATENT DOCUMENTS

| | | | |
|---|---|---|---|
| CN | 104065157 A | | 9/2014 |
| CN | 104953696 A | * | 9/2015 |
| CN | 104953696 A | | 9/2015 |
| CN | 105634108 A | | 6/2016 |
| CN | 105723587 A | | 6/2016 |
| CN | 109075602 A | | 12/2018 |

OTHER PUBLICATIONS

China National Intellectual Property Administration, Search Report, CN2019104395900, dated Mar. 4, 2021.

* cited by examiner

OFFLINE UNINTERRUPTIBLE POWER SOURCE AND CONTROL METHOD THEREFOR

CROSS-REFERENCE TO RELATED APPLICATIONS

The present application claims priority to International Application No. PCT/CN2020/091458 filed on May 21, 2020, published as WO2020/238735 entitled as entitled OFFLINE UNINTERRUPTIBLE POWER SOURCE AND CONTROL METHOD THEREFOR which claims priority to Chinese Application No. 201910439590.0; Filed May 24, 2019, entitled OFFLINE UNINTERRUPTIBLE POWER SOURCE AND CONTROL METHOD THEREFOR, the disclosures of which are incorporated herein by reference in their entireties.

TECHNICAL FIELD

The present invention relates to the field of electronic circuits, in particular to an offline uninterruptible power source and a control method therefor.

BACKGROUND ART

An offline uninterruptible power source directly supplies power from a mains supply to a load when a mains voltage is within a normal range, and a rechargeable battery is in a charging state; when the mains voltage is abnormal or power failure is caused, an inverter is switched into a working state to convert a direct current in the rechargeable battery into a stable alternating current to be output; and when the mains voltage is lower or higher, a transformer connected to alternating-current input end is used for adjusting the mains voltage, and thus, an alternating-current output end has a stable output voltage.

FIG. 1 is a circuit diagram of an offline uninterruptible power source in the prior art. As shown in FIG. 1, the offline uninterruptible power source 1 includes an electromagnetic compatibility (EMC) filter 11 connected between an alternating-current input end 10 and an alternating-current output end 10' of the EMC filter 11; a safety switch 12, which is configured as a double-pole single-throw relay or configured to include a safety switch unit 121 and a safety switch unit 122; a first switch 131, a second switch 132 and an output switch 14, which are successively connected between the safety switch 12 and a terminal L of the alternating-current output end 10'; a transformer Tr1, wherein one end T1 of a primary side of the transformer Tr1 is connected between the safety switch 12 and a terminal N of the alternating-current output end 10', the first switch 131 is operable such that the safety switch 12 is connected to either of the other end T2 or a tap T3 of the primary side of the transformer Tr1, and the second switch 132 is operable such that the output switch 14 is connected to either of the other end T2 or the tap T3 of the primary side of the transformer Tr1; and a rechargeable battery 16, a bidirectional converter 15 and an auxiliary power supply system 17, wherein the rechargeable battery 16 is connected to a secondary side of the transformer Tr1 by the bidirectional converter 15, and an input end of the auxiliary power supply system 17 is connected to two ends of the rechargeable battery 16 and is used for supplying various required voltages to the offline uninterruptible power source 1. In order to simplify the circuit diagram, a mains detection device for detecting a mains voltage, a battery detection device for detecting a charging state of the rechargeable battery 16 and a control device for controlling a working state of the bidirectional converter 15 and controlling on-off states of the safety switch 12, the first switch 131, the second switch 132 and the output switch 14 are not shown in FIG. 1.

When the mains voltage is higher, the offline uninterruptible power source 1 is controlled to be in an automatic voltage drop adjustment mode, wherein the safety switch 12 and the output switch 14 are controlled to be switched on, the first switch 131 is controlled to be connected to the terminal T2 of the primary side of the transformer Tr1, the second switch 132 is controlled to be connected to the tap T3 of the primary side of the transformer Tr1, and therefore, the alternating-current output end 10' outputs a voltage-dropped alternating current. Meanwhile, the bidirectional converter 15 is controlled to convert an alternating current of the secondary side of the transformer Tr1 into a direct current so as to charge the rechargeable battery 16 and supply the direct current to the auxiliary power supply system 17.

When the mains voltage is lower, the offline uninterruptible power source 1 is controlled to be in an automatic voltage boosting adjustment mode, wherein the safety switch 12 and the output switch 14 are controlled to be switched on, the first switch 131 is controlled to be connected to the tap T3 of the primary side of the transformer Tr1, the second switch 132 is controlled to be connected to the terminal T2 of the primary side of the transformer Tr1, and therefore, the alternating-current output end 10' outputs a voltage-boosted alternating current. Meanwhile, the bidirectional converter 15 is controlled to convert the alternating current of the secondary side of the transformer Tr1 into the direct current so as to charge the rechargeable battery 16 and supply the direct current to the auxiliary power supply system 17.

When the mains voltage is abnormal (for example, the voltage is overhigh) or power failure is caused, the offline uninterruptible power source 1 is controlled to be in a battery mode, wherein the safety switch 12 is controlled to be switched off, the output switch 14 is controlled to be switched on, the second switch 132 is controlled to be connected to the terminal T2 of the primary side of the transformer Tr1, the bidirectional converter 15 is controlled to work so as to convert the direct current of the rechargeable battery 16 into an alternating current which is subjected to voltage transformation by the transformer Tr1, and then, the required alternating current is obtained on the alternating-current output end 10'. Meanwhile, the rechargeable battery 16 supplies the direct current to the auxiliary power supply system 17.

When the mains voltage is within the normal range, the offline uninterruptible power source 1 is controlled to be in a normal mode. The safety switch 12 and the output switch 14 are controlled to be switched on, and the first switch 131 and the second switch 132 are controlled to be both connected to the terminal T2 of the primary side of the transformer Tr1. Meanwhile, the bidirectional converter 15 is controlled to convert the alternating current of the secondary side of the transformer Tr1 into the direct current so as to charge the rechargeable battery 16 and supply the direct current to the auxiliary power supply system 17.

FIG. 2 is an equivalent circuit diagram of the offline uninterruptible power source shown in FIG. 1 in a normal mode after a rechargeable battery is fully charged. As shown in FIG. 2, a mains supply of the alternating-current input end 10 is transmitted to the alternating-current output end 10' after passing through the EMC filter 11 as well as the safety switch 12, the first switch 131, the second switch 132 and the output switch 14 which are switched on. On one hand, the electric energy efficiency is reduced by contacts of the three switches between the safety switch 12 and the terminal L of the alternating-current output end 10'. On the other hand, the primary side of the transformer Tr1 is electrically connected with the alternating-current output end 10', and therefore, the transformer Tr1 is higher in no-load loss. Moreover, the transformer Tr1 works all the time, the bidirectional converter 15 is controlled to work all the time, and the rechargeable battery 16 is in a floating charging state all the time after being fully charged. When the rechargeable battery 16 is in the floating charging state all the time, a positive plate of the rechargeable battery 16 may be inactivated to generate a great deal of PbSO4 which is absorbed onto a negative plate. In this way, the rechargeable battery 16 will be reduced in activity and increased in internal resistance, and furthermore, the rechargeable battery 16 will be rapidly reduced in capacity and greatly shortened in life.

SUMMARY OF THE INVENTION

For solving the above-mentioned technical problems existing in the prior art, the present invention provides an offline uninterruptible power source including:

a safety switch connected between an alternating-current input end and an alternating-current output end;

a transformer, wherein one end of a primary side thereof is connected to one terminal of the alternating-current output end;

a first switch, a second switch and an output switch, which are successively connected between the safety switch and the other terminal of the alternating-current output end, wherein the first switch is operable such that the safety switch is connected to either of the other end or a tap of the primary side of the transformer, and the second switch is operable such that the output switch is connected to either of the other end or the tap of the primary side of the transformer;

a third switch, which is operable such that the safety switch is connected to either of the first switch or the other terminal of the alternating-current output end; and a bidirectional converter, which is configured to controllably convert an alternating current of a secondary side of the transformer into a direct current so as to charge a rechargeable battery and convert the direct current of the rechargeable battery into an alternating current.

Preferably, the offline uninterruptible power source further includes:

a charger, wherein an input end thereof is connected to the alternating-current input end by the safety switch and is configured to controllably convert an alternating current of the alternating-current input end into a direct current; and an auxiliary power supply system, wherein an input end thereof is connected to an output end of the charger.

Preferably, the third switch includes:

a common terminal connected with the safety switch;

a first switching terminal connected between the output switch and the other terminal of the alternating-current output end; and a second switching terminal connected to the first switch.

Preferably, an output end of the charger is connected to two ends of the rechargeable battery.

Preferably, the offline uninterruptible power source further includes a diode, wherein an anode thereof is connected to a positive electrode of the rechargeable battery, and a cathode thereof is connected to a positive terminal on the output end of the charger.

Preferably, the output power of the charger is smaller than the maximum charging power of the rechargeable battery, and an output voltage of the charger is higher than voltages on two ends of the rechargeable battery.

Preferably, the offline uninterruptible power source further includes:

a mains detection device, configured to detect a mains voltage of the alternating-current input end;

a battery detection device, configured to detect a charging state of the rechargeable battery; and a control device, configured to control working states of the charger and the bidirectional converter according to the mains voltage and the charging state of the rechargeable battery and control on-off states of the safety switch, the first switch, the second switch, the third switch and the output switch.

Preferably, when the mains voltage is higher than or equal to a first threshold voltage and is lower than a second threshold voltage, the control device controls the safety switch to be switched on, controls the third switch to be connected to the first switch, controls the first switch to be connected to the tap of the primary side of the transformer, controls the second switch to be connected to the other end of the primary side of the transformer, and controls the output switch to be switched on; wherein when the rechargeable battery is not fully charged, the control device controls the charger to stop working, and controls the bidirectional converter to convert the alternating current of the secondary side of the transformer into the direct current; and when the rechargeable battery is fully charged, the control device controls the bidirectional converter to stop working, and controls the charger to convert the alternating current of the alternating-current input end into the direct current.

Preferably, when the mains voltage is higher than or equal to the second threshold voltage and is lower than a third threshold voltage, the control device controls the safety switch to be switched on; wherein when the rechargeable battery is not fully charged, the control device controls the third switch to be connected to the first switch, controls the first switch and the second switch to be connected to the other end of the primary side of the transformer, controls the output switch to be switched on, and controls the bidirectional converter to convert the alternating current of the secondary side of the transformer into the direct current; and when the rechargeable battery is fully charged, the control device controls the third switch to be connected to the other terminal of the alternating-current output end, controls the output switch to be switched off, controls the bidirectional converter to stop working, and controls the charger to convert the alternating current of the alternating-current input end into the direct current.

Preferably, when the mains voltage is higher than or equal to the third threshold voltage and is lower than a fourth threshold voltage, the control device controls the safety switch to be switched on, controls the third switch to be connected to the first switch, controls the first switch to be connected to the other end of the primary side of the transformer, controls the second switch to be connected to the tap of the primary side of the transformer, and controls the output switch to be switched on; wherein when the rechargeable battery is not fully charged, the control device controls the charger to stop working, and controls the bidirectional converter to convert the alternating current of the secondary side of the transformer into the direct current; and when the rechargeable battery is fully charged, the control device controls the bidirectional converter to stop working, and controls the charger to convert the alternating current of the alternating-current input end into the direct current.

Preferably, when the first threshold voltage is higher than the mains voltage or is higher than or equal to the fourth threshold voltage, the control device controls the safety switch to be switched off, controls the second switch to be connected to the other end of the primary side of the transformer, controls the output switch to be switched on, and controls the bidirectional converter to convert the direct current of the rechargeable battery into the alternating current.

The present invention further provides a control method for the above-mentioned offline uninterruptible power source. The control method includes the following steps: detecting a mains voltage of the alternating-current output end, detecting a charging state of the rechargeable battery, controlling working states of the charger and the bidirectional converter according to the mains voltage and the charging state of the rechargeable battery, and controlling on-off states of the safety switch, the first switch, the second switch, the third switch and the output switch.

Preferably, when the mains voltage is higher than or equal to a first threshold voltage and is lower than a second threshold voltage, the safety switch is controlled to be switched on, the third switch is controlled to be connected to the first switch, the first switch is controlled to be connected to the tap of the primary side of the transformer, the second switch is controlled to be connected to the other end of the primary side of the transformer, and the output switch is controlled to be switched on; wherein when the rechargeable battery is not fully charged, the charger is controlled to stop working, and the bidirectional converter is controlled to convert the alternating current of the secondary side of the transformer into the direct current; and when the rechargeable battery is fully charged, the bidirectional converter is controlled to stop working, and the charger is controlled to convert the alternating current of the alternating-current input end into the direct current.

Preferably, when the mains voltage is higher than or equal to the second threshold voltage and is lower than a third threshold voltage, the safety switch is controlled to be switched on; wherein when the rechargeable battery is not fully charged, the third switch is controlled to be connected to the first switch, the first switch and the second switch are controlled to be connected to the other end of the primary side of the transformer, the output switch is controlled to be switched on, and the bidirectional converter is controlled to convert the alternating current of the secondary side of the transformer into the direct current; and when the rechargeable battery is fully charged, the third switch is controlled to be connected to the other terminal of the alternating-current output end, the output switch is controlled to be switched off, the bidirectional converter is controlled to stop working, and the charger is controlled to convert the alternating current of the alternating-current input end into the direct current.

Preferably, when the mains voltage is higher than or equal to the third threshold voltage and is lower than a fourth threshold voltage, the safety switch is controlled to be switched on, the third switch is controlled to be connected to the first switch, the first switch is controlled to be connected to the other end of the primary side of the transformer, the second switch is controlled to be connected to the tap of the primary side of the transformer, and the output switch is controlled to be switched on; wherein when the rechargeable battery is not fully charged, the charger is controlled to stop working, and the bidirectional converter is controlled to convert the alternating current of the secondary side of the transformer into the direct current; and when the rechargeable battery is fully charged, the bidirectional converter is controlled to stop working, and the charger is controlled to convert the alternating current of the alternating-current input end into the direct current.

Preferably, when the first threshold voltage is higher than the mains voltage or is higher than or equal to the fourth threshold voltage, the safety switch is controlled to be switched off, the second switch is controlled to be connected to the other end of the primary side of the transformer, the output switch is controlled to be switched on, and the bidirectional converter is controlled to convert the direct current of the rechargeable battery into the alternating current.

The offline uninterruptible power source provided by the present invention has high electric energy transmission efficiency; a small charger with a lower input withstand voltage can be selected such that the cost of the charger is reduced; and the rechargeable battery can be prevented from being in the floating charging state, moreover, the life of the rechargeable battery can be prolonged, and the cost of the rechargeable battery can be reduced.

BRIEF DESCRIPTION OF THE DRAWINGS

Embodiments of the present invention will be further described below with reference to the accompanying drawings, in which.

DETAILED DESCRIPTION OF THE INVENTION

In order to make objectives, technical solutions and advantages of the present invention clearer and more understandable, the present invention will be further described in detail below in conjunction with the accompanying drawings and specific embodiments.

Figure 1:
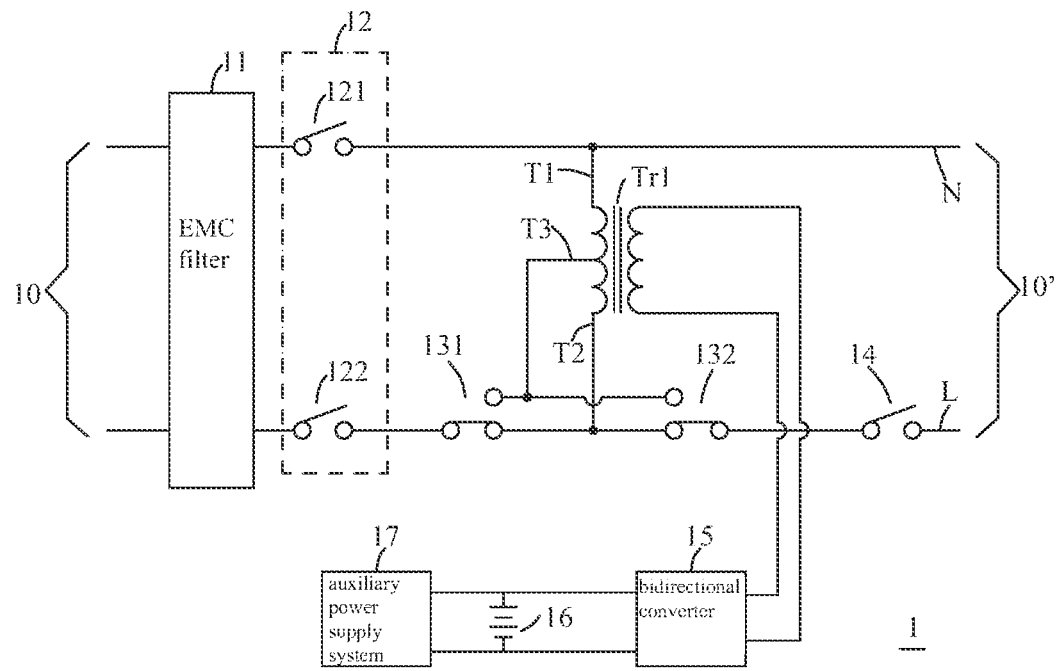
FIG. 1 is a circuit diagram of an offline uninterruptible power source in the prior art.
Figure 3:
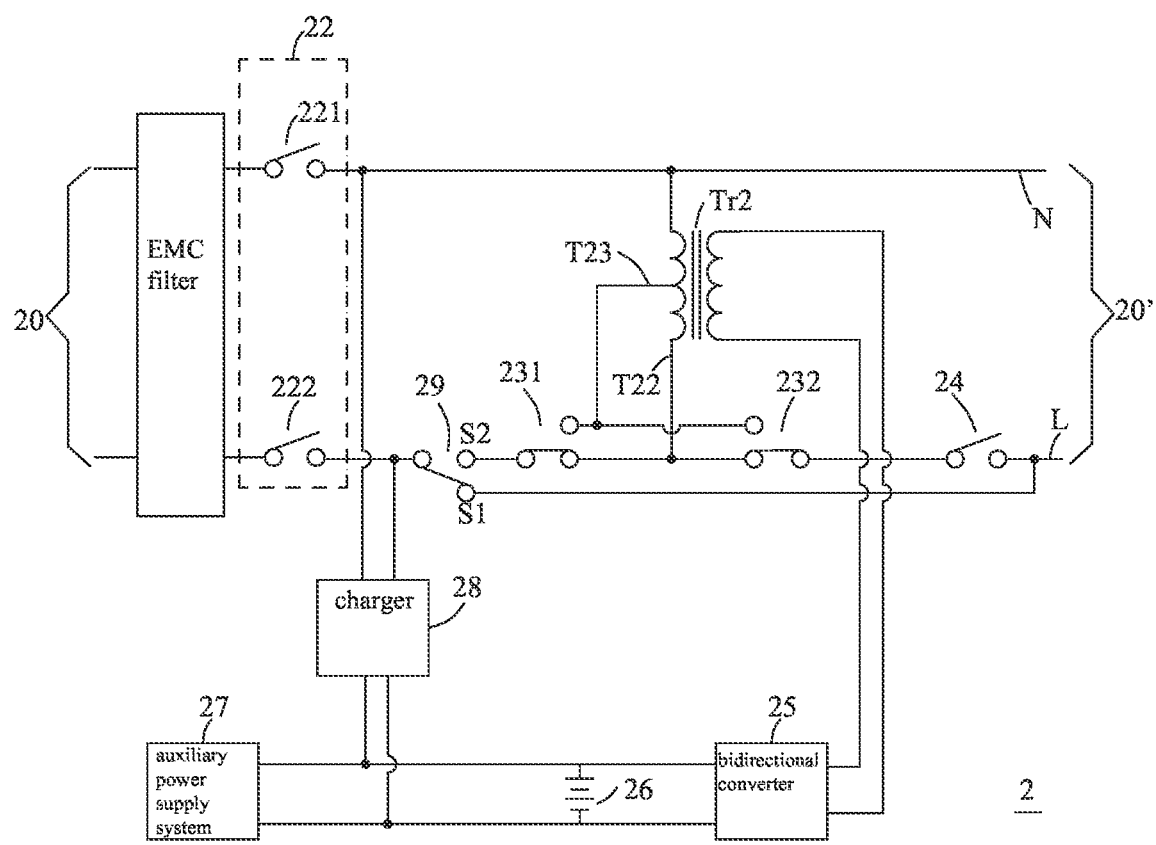
FIG. 3 is a circuit diagram of an offline uninterruptible power source in accordance with a first embodiment of the present invention.

FIG. 3 is a circuit diagram of an offline uninterruptible power source in accordance with a first embodiment of the present invention. As shown in FIG. 3, FIG. 3 is substantially the same as FIG. 1, except that an offline uninterruptible power source 2 further includes a charger 28 and a third switch 29. The third switch 29 includes a common terminal connected with a second safety switch unit 222 of a safety switch 22, a first switching terminal S1 electrically connected between an output switch 24 and a terminal L of an alternating-current output end 20' and a second switching terminal S2 connected with a common terminal of a first switch 231. The third switch 29 is operable such that the safety switch 22 is connected to either of the first switch 231 or the terminal L of the alternating-current output end 20', and the safety switch 22 is used for achieving a feedback protection function. An input end of the charger 28 is connected to an alternating-current input end 20 by the safety switch 22, that is, a terminal of the input end of the charger 28 is connected between a first safety switch unit 221 and a terminal N of the alternating-current output end 20', the other terminal of the input end is connected between the second safety switch unit 222 and the third switch 29, and an output end of the charger 28 is connected to an input end of an auxiliary power supply system 27. In order to simplify the circuit diagram, a mains detection device for detecting a mains voltage, a battery detection device for detecting a charging state of a rechargeable battery 26 and a control device for controlling working states of the charger 28 and a bidirectional converter 25 and controlling on-off states of the safety switch 22, the first switch 231, a second switch 232, the third switch 29 and the output switch 24 are not shown in FIG. 3.

Working modes of the offline uninterruptible power source 2 will be introduced below according to different situations.

(1) When the mains voltage is within a normal range, the offline uninterruptible power source 2 is controlled to be in a normal mode. The safety switch 22 (that is, the first safety switch unit 221 and the second safety switch unit 222) is controlled to be switched on. If the rechargeable battery 26 is not fully charged, a common terminal of the third switch 29 is controlled to be connected with the second switching terminal S2 (that is, the third switch 29 is enabled to be connected to the first switch 231), the first switch 231 and the second switch 232 are controlled to be both connected to a terminal T22 of a primary side of a transformer Tr2, the output switch 24 is controlled to be switched on, and an alternating current of the alternating-current input end 20 will be transmitted to the alternating-current output end 20'. Meanwhile, the bidirectional converter 25 is controlled to convert an alternating current of a secondary side of the transformer Tr2 into a direct current so as to rapidly charge the rechargeable battery 26 and supply the direct current to the auxiliary power supply system 27.

Figure 2:
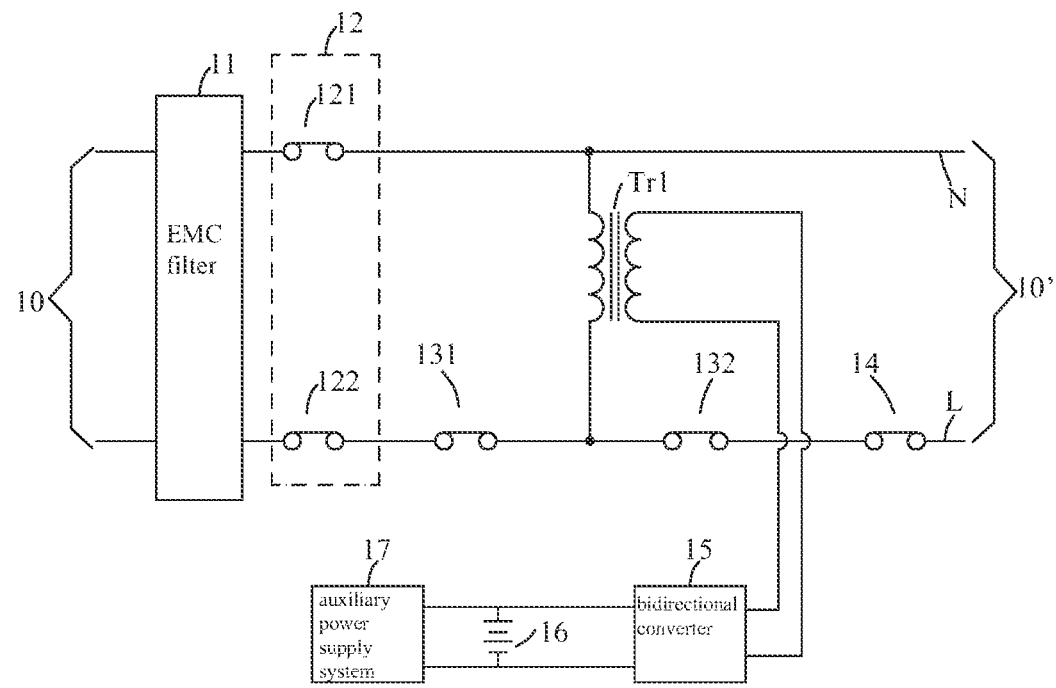
FIG. 2 is an equivalent circuit diagram of the offline uninterruptible power source shown in FIG. 1 in a normal mode after a rechargeable battery is fully charged.
Figure 4:
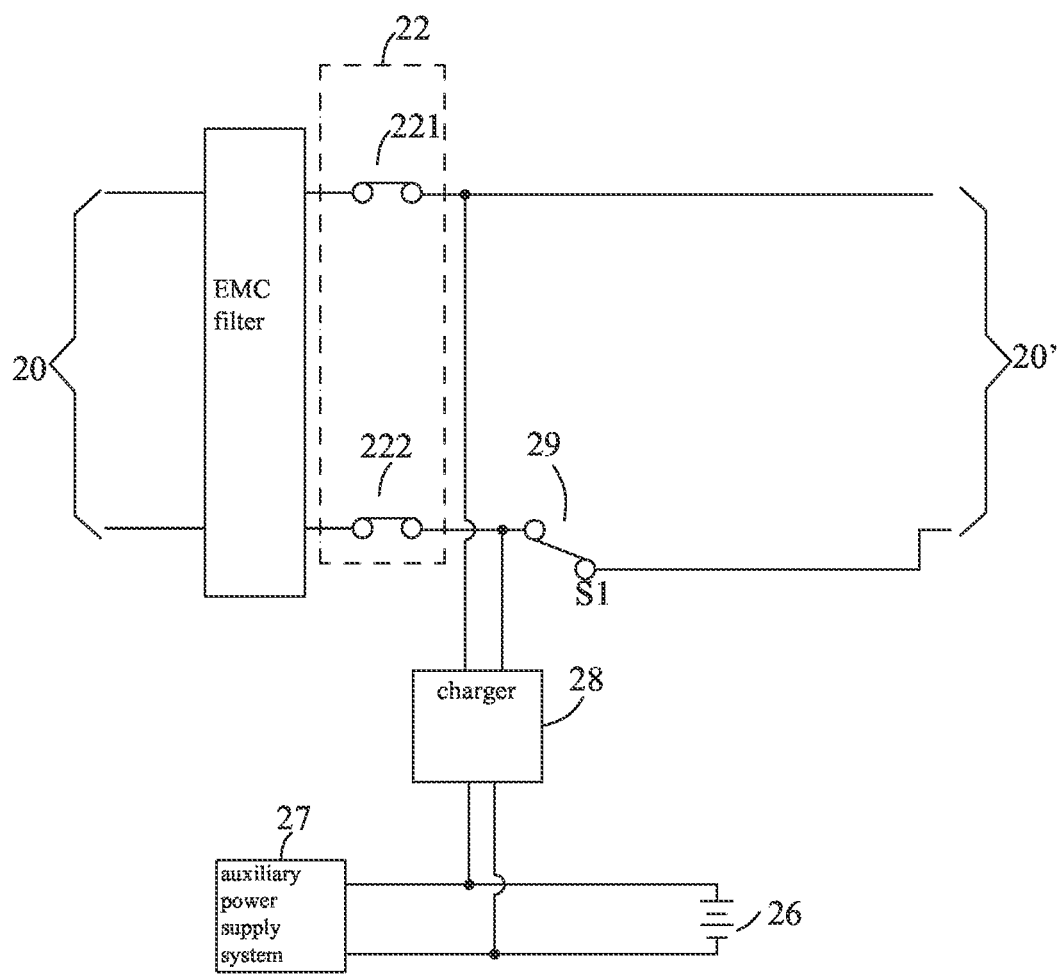
FIG. 4 is an equivalent circuit diagram of the offline uninterruptible power source shown in FIG. 3 in a normal mode after a rechargeable battery is fully charged.

If the rechargeable battery 26 is fully charged, at the moment, the third switch 29 is controlled in a manner that the common terminal of the third switch 29 is connected to the first switching terminal S1 (that is, the third switch 29 is connected to the terminal L of the alternating-current output end 20'), the output switch 24 is controlled to be switched off, the bidirectional converter 25 is controlled to stop charging the rechargeable battery 26, and meanwhile, the charger 28 is controlled to convert the alternating current of the alternating-current input end 20 into a direct current so as to charge the rechargeable battery 26 and supply the required direct current to the auxiliary power supply system 27. FIG. 4 is an equivalent circuit diagram of the offline uninterruptible power source shown in FIG. 3 in a normal mode after a rechargeable battery is fully charged. By comparing an equivalent circuit shown in FIG. 4 with an equivalent circuit shown in FIG. 2, it can be known that: firstly, the primary side of the transformer Tr2 is not connected to a circuit such that transformer no-load loss does not exist, and the bidirectional converter 25 stops working. Secondly, the safety switch 22 is directly connected to the terminal L of the alternating-current output end 20' by the third switch 29 such that the loss of contacts of two switches is reduced. Thirdly, the third switch 29 is in a normally-switched-off state, the output switch 24 is in a normally-switched-on state, and therefore, the loss of electromagnetic coils (not shown in FIG. 3) of the output switch 24 is reduced. Tested by an inventor under the same condition, it is found that the electric energy transmission efficiency of the equivalent circuit shown in FIG. 2 is 95.62% and the electric energy transmission efficiency of the equivalent circuit shown in FIG. 24 is increased to 98.75%, and therefore, the electric energy transmission efficiency is increased, and then, the certification standard of the Energy Star executed by USEPA and DOE is met.

(2) When the mains voltage is higher, the offline uninterruptible power source 2 is controlled to be in an automatic voltage drop adjustment mode, wherein the safety switch 22 is controlled to be switched on, the third switch 29 is controlled in a manner that the common terminal of the third switch 29 is connected to the second switching terminal S2 (that is, the third switch 29 is connected to the first switch 231), the first switch 231 is controlled to be connected to the terminal T22 of the primary side of the transformer Tr2, the second switch 232 is controlled to be connected to a tap T23 of the primary side of the transformer Tr2, and the output switch 24 is controlled to be switched on.

Wherein if the rechargeable battery 26 has not been fully charged, the charger 28 stops working, the bidirectional converter 25 is controlled to convert the alternating current of the secondary side of the transformer Tr2 into the direct current so as to rapidly charge the rechargeable battery 26 and supply the direct current to the auxiliary power supply system 27.

If the rechargeable battery 26 has been fully charged, the bidirectional converter 25 stops working, the charger 28 is controlled to convert the alternating current of alternating-current input end 20 into the direct current so as to charge the rechargeable battery 26 and supply the required direct current to the auxiliary power supply system 27.

(3) When the mains voltage is lower, the offline uninterruptible power source 2 is controlled to be in an automatic voltage boosting adjustment mode, wherein the safety switch 12 is controlled to be switched on, the third switch 29 is controlled in a manner that the common terminal of the third switch 29 is connected to the second switching terminal S2 (that is, the second safety switch unit 222 is connected to the first switch 231), the first switch 231 is controlled to be connected to the tap T23 of the primary side of the transformer Tr2, the second switch 232 is controlled to be connected to the terminal T22 of the primary side of the transformer Tr2, and the output switch 24 is controlled to be switched on.

If the rechargeable battery 26 has not been fully charged, the charger 28 stops working, the bidirectional converter 25 is controlled to convert the alternating current of the secondary side of the transformer Tr2 into the direct current so as to rapidly charge the rechargeable battery 26 and supply the direct current to the auxiliary power supply system 27.

If the rechargeable battery 26 has been fully charged, the bidirectional converter 25 stops working, the charger 28 is controlled to convert the alternating current of alternating-current input end 20 into the direct current so as to charge the rechargeable battery 26 and supply the required direct current to the auxiliary power supply system 27.

(4) When the mains voltage is abnormal (for example, the voltage is overhigh) or power failure is caused, the offline uninterruptible power source 2 is controlled to be in a battery mode, wherein the safety switch 22 is controlled to be switched off, the second switch 232 is controlled to be connected to the terminal T22 of the primary side of the transformer Tr2, the output switch 24 is controlled to be switched on, meanwhile, the bidirectional converter 25 is controlled to convert the direct current of the rechargeable battery 26 into an alternating current which is subjected to voltage transformation by the transformer Tr2, and then, the required alternating current is achieved on the alternating-current output end 20'. Meanwhile, the rechargeable battery 26 supplies the direct current to the auxiliary power supply system 17.

When the mains voltage is overhigh, the safety switch 22 is controlled to be switched off, the situation that the mains supply on the alternating-current input end 20 is transmitted to the input end of the charger 28 by the safety switch 22 in a switch-off state may not be achieved, and therefore, the charger 28 may select a small charger with a lower input withstand voltage such that the cost of the circuit is reduced.

In combination with the above-mentioned working mode, it can be known that after the rechargeable battery 26 is fully charged, the charger 28 is controlled to work so as to supply power to the auxiliary power supply system 27. In the uninterruptible power source, the power of the auxiliary power supply system 27 is much lower than the maximum charging power of the rechargeable battery 26, and therefore, a small-sized charger of which the power is adapted to the power of the auxiliary power supply system 27 may be selected, that is, the output power of the charger 28 is smaller than the maximum charging power of the rechargeable battery 26, so that the cost of the circuit is reduced.

In the normal mode, when the rechargeable battery 26 is not fully charged, the first switch 231 and the second switch 232 are controlled to be both connected to the terminal T22 of the primary side of the transformer Tr2, then, all windings of the primary side of the transformer Tr2 are electrically connected to the alternating-current input end 20, and thus, the transformer Tr2 can be effectively prevented from being saturated.

In the battery mode, the second switch 232 is controlled to be connected to the terminal T22 of the primary side of the transformer Tr2, then, all the windings of the primary side of the transformer Tr2 are electrically connected to the alternating-current output end 20', and thus, an alternating current voltage which is high as much as possible may be obtained on the alternating-current output end 20' under the condition that a duty ratio is constant. Compared with the mode that the second switch 232 is controlled to be connected to the tap T23 of the primary side of the transformer Tr2, this mode lies in that the rechargeable battery 26 with a lower output voltage may be selected, and thus, the cost of the rechargeable battery 26 is reduced.

Figure 5:
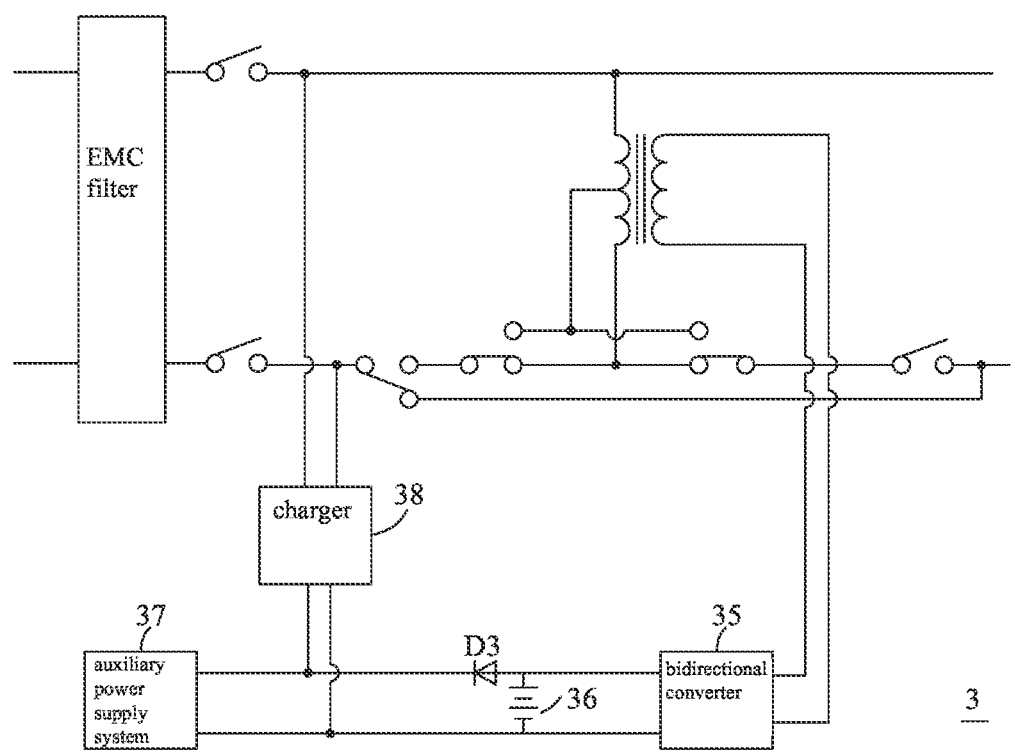
FIG. 5 is a circuit diagram of an offline uninterruptible power source in accordance with a second embodiment of the present invention.

FIG. 5 is a circuit diagram of an offline uninterruptible power source in accordance with a second embodiment of the present invention. A mains detection device, a battery detection device and a control device are not shown in FIG. 5. As shown in FIG. 5, an offline uninterruptible power source 3 is substantially the same as the offline uninterruptible power source 2 shown in FIG. 2, except that the offline uninterruptible power source 3 further includes a diode D3 connected between a positive electrode of a rechargeable battery 36 and a positive terminal on an output end of a charger 38, wherein an anode of the diode D3 is connected to the positive electrode of the rechargeable battery 36, and a cathode of the diode D3 is connected to the positive terminal on the output end of the charger 38.

Working modes of the offline uninterruptible power source 3 will be introduced below according to different situations.

Figure 6:
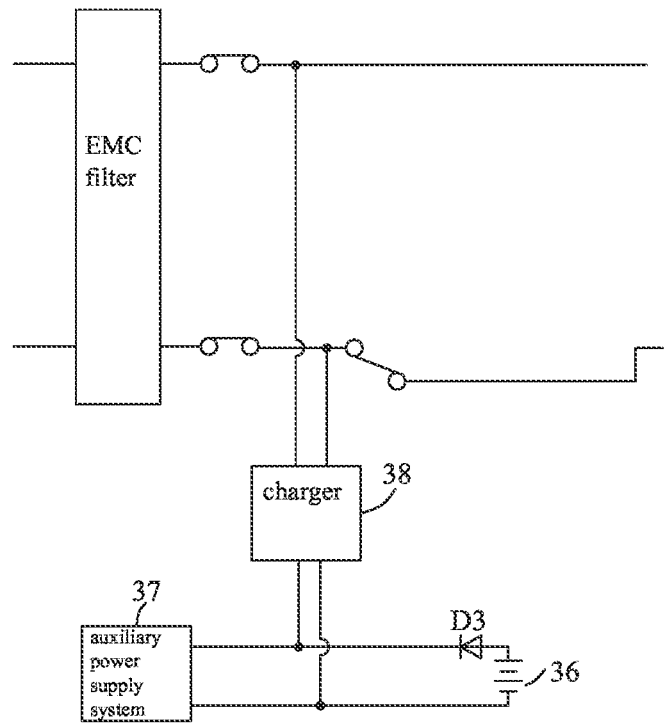
FIG. 6 is an equivalent circuit diagram of the offline uninterruptible power source shown in FIG. 5 in a normal mode after a rechargeable battery is fully charged.

(1) When the mains voltage is within a normal range, a control method for the offline uninterruptible power source 3 is the same as a control method for the offline uninterruptible power source 2, the descriptions thereof are omitted herein. FIG. 6 is an equivalent circuit diagram of the offline uninterruptible power source shown in FIG. 5 in a normal mode after a rechargeable battery is fully charged. As shown in FIG. 6, the charger 38 is controlled to supply a required direct current to an auxiliary power supply system 37. A charging voltage of the charger 38 is higher than voltages on two ends of the rechargeable battery 36, the phenomenon that the rechargeable battery 36 supplies power to the auxiliary power supply system 37 via the diode D3 may be avoided, and the charger 38 is incapable of further charging the rechargeable battery 36 in a fully-charged state due to a reverse cut-off function of the diode D3. Therefore, at the moment, the rechargeable battery 36 is in a sleep mode, and thus, the service life can be prolonged.

(2) When the mains voltage is higher, a control method for the offline uninterruptible power source 3 is the same as a control method for the offline uninterruptible power source 2, the descriptions thereof are omitted herein. Similarly, the rechargeable battery 36 is in the sleep mode after being fully charged, and thus, the service life can be prolonged.

(3) When the mains voltage is lower, a control method for the offline uninterruptible power source 3 is the same as a control method for the offline uninterruptible power source 2, the descriptions thereof are omitted herein. Similarly, the rechargeable battery 36 is in the sleep mode after being fully charged, and thus, the service life can be prolonged.

(4) When the mains voltage is abnormal or power failure is caused, a control method for the offline uninterruptible power source 3 is the same as a control method for the offline uninterruptible power source 2, the descriptions thereof are omitted herein.

It can be known from the above that after the rechargeable battery 36 is fully charged, a bidirectional converter 35 stops charging the rechargeable battery 36, and meanwhile, the charger 38 starts to work and supply the required direct current to the auxiliary power supply system 37. Due to the reverse cut-off function of the diode D3, at the moment, the charger 38 is incapable of charging the rechargeable battery 36. In addition, the output voltage of the charger 38 is enabled to be higher than the voltages on the two ends of the rechargeable battery 36, at the moment, the phenomenon that the rechargeable battery 36 supplies power to the auxiliary power supply system 37 via the diode D3 may be avoided. The rechargeable battery 36 is neither charged nor discharged, thereby being prevented from being in a floating charging state all the time.

When the rechargeable battery 36 is required to be charged, the bidirectional converter 35 works to rapidly charge the rechargeable battery 36. After the rechargeable battery 36 is fully charged, the bidirectional converter 35 stops working, the rechargeable battery 36 is automatically in a sleep mode, and thus, the life of the rechargeable battery 36 is greatly prolonged.

In other control methods provided by the present invention, in a normal mode or an automatic voltage adjustment mode, when the rechargeable battery 36 is not fully charged, the charger 38 is controlled to work all the time so as to supply the required direct current to the auxiliary power supply system 37.

In the above-mentioned embodiments of the present invention, the bidirectional converter may be implemented by adopting a single circuit module achieving the above-mentioned functions or implemented by adopting a combination of circuit modules. For example, a combination of a circuit module capable of converting a direct current into an alternating current and a circuit module capable of converting an alternating current into a direct current to charge a battery, such as an inverter, is selected.

The EMC filter is suitable for inhibiting noise and high harmonic waves of a power gird as well as noise and high-frequency harmonic waves generated by a switching power source, and therefore, the offline uninterruptible power source does not have to be provided with the EMC filter in an application occasion where the requirement for power utilization quality is not high. In other embodiments of the present invention, the EMC filter is connected to an alternating-current input end by a safety switch (that is, the safety switch is connected between the alternating-current input end and the EMC filter).

According to the control method provided by the present invention, the different working modes are selected based on the mains voltage on the alternating-current input end. For example, when the mains voltage is lower than a first threshold voltage, the offline uninterruptible power source is in a battery mode; when the mains voltage is higher than or equal to the first threshold voltage and is lower than a second threshold voltage, the offline uninterruptible power source is in an automatic voltage boosting adjustment mode; when the mains voltage is higher than or equal to the second threshold voltage and is lower than a third threshold voltage, the offline uninterruptible power source is in a normal mode; when the mains voltage is higher than or equal to the third threshold voltage and is lower than a fourth threshold voltage, the offline uninterruptible power source is in an automatic voltage drop adjustment mode; and when the mains voltage is higher than or equal to the fourth threshold voltage, the offline uninterruptible power source is in the battery mode. The control method provided by the present invention is not intended to limit specific numerical values of the first threshold voltage, the second threshold voltage, the third threshold voltage and the fourth threshold voltage, but is selected by a user according to a rated voltage of a mains supply, a voltage deviation range allowed by a load and a turn ratio of a transformer. For example, if a rated voltage value of the mains supply is 220 V, a voltage range allowed by the load is 200 V to 240 V, and a ratio of turns of the terminal T1 and the tap T3 of the primary side of the transformer Tr1 to the turns of the terminal T1 and the terminal T2 is 5:6, the first threshold voltage may be selected as 167 V, the second threshold voltage may be selected as 200 V, the third threshold voltage may be selected as 240 V, and the fourth threshold voltage may be selected as 288 V.

Although the present invention has been described with reference to preferred embodiments, the present invention is not limited to the embodiments described herein. The present invention may further include various changes and variations without departing from the scope of the present invention.

The invention claimed is:

1. An offline uninterruptible power source, comprising:
a safety switch connected between an alternating-current input and an alternating-current output;
a transformer, wherein a first terminal of a primary side thereof is connected to a first terminal of the alternating-current output;
a first switch, a second switch and an output switch successively connected between the safety switch and a second terminal of the alternating-current output, wherein the first switch is operable to selectively connect the safety switch to either the second terminal or a tap of the primary side of the transformer, and wherein the second switch is operable to selectively connect the output switch to either the second terminal or the tap of the primary side of the transformer;
a third switch operable to selectively connect the safety switch to either the first switch or the second terminal of the alternating-current output, wherein selectively connecting the safety switch to the second terminal of the alternating-current output includes bypassing the first switch, the second switch, the output switch and the transformer; and
a bidirectional converter configured to controllably convert an alternating current of a secondary side of the transformer into a direct current so as to charge a rechargeable battery and to convert the direct current of the rechargeable battery into an alternating current.

2. The offline uninterruptible power source of claim 1, wherein the offline uninterruptible power source further comprises:
a charger having an input connected to the alternating-current input by the safety switch and configured to controllably convert an alternating current of the alternating-current input into a direct current; and
an auxiliary power supply system having an input connected to an output of the charger.

3. The offline uninterruptible power source of claim 2, wherein the third switch comprises:
a common terminal connected to the safety switch;
a first switching terminal connected between the output switch and the second terminal of the alternating-current output; and
a second switching terminal connected to the first switch.

4. The offline uninterruptible power source of claim 2, wherein an output of the charger is connected to two terminals of the rechargeable battery.

5. The offline uninterruptible power source of claim 2, wherein the offline uninterruptible power source further comprises a diode having an anode connected to a positive electrode of the rechargeable battery and a cathode connected to a positive terminal of the output of the charger.

6. The offline uninterruptible power source of claim 5, wherein an output power of the charger is less than the maximum charging power of the rechargeable battery, and wherein an output voltage of the charger is greater than a voltage of the rechargeable battery.

7. The offline uninterruptible power source of claim 2, further comprising:
a mains detection device configured to detect a mains voltage of the alternating-current input;
a battery detection device configured to detect a charging state of the rechargeable battery; and
a control circuit configured to control working states of the charger and the bidirectional converter according to the mains voltage and the charging state of the rechargeable battery and to control states of the safety switch, the first switch, the second switch, the third switch and the output switch.

8. The offline uninterruptible power source of claim 7, wherein
when the mains voltage is greater than or equal to a first threshold voltage and less than a second threshold voltage, the control circuit turns the safety switch on, connects the third switch to the first switch, connects the first switch to the tap of the primary side of the transformer, connects the second switch to the second terminals of the primary side of the transformer, and turns the output switch on; wherein when the rechargeable battery is not fully charged, the control circuit deactivates the charger and controls the bidirectional converter to convert alternating current of the secondary side of the transformer into direct current; and wherein when the rechargeable battery is fully charged, the control circuit deactivates the bidirectional converter and controls the charger to convert alternating current of the alternating-current input into direct current;

when the mains voltage is higher than or equal to the second threshold voltage and is lower than a third threshold voltage, the control circuit turns the safety switch on; wherein when the rechargeable battery is not fully charged, the control circuit connects the third switch to the first switch, connects the first switch and the second switch to the second terminal of the primary side of the transformer, turns the output switch on, and controls the bidirectional converter to convert alternating current of the secondary side of the transformer into direct current; and when the rechargeable battery is fully charged, the control circuit connects the third switch to the second terminal of the alternating-current output, turns the output switch off, deactivates the bidirectional converter, and controls the charger to convert alternating current of the alternating-current input into direct current;

when the mains voltage is higher than or equal to the third threshold voltage and is lower than a fourth threshold voltage, the control circuit turns the safety switch on, connects the third switch to the first switch, connects the first switch to the second terminal of the primary side of the transformer, connects the second switch to the tap of the primary side of the transformer, and turns the output switch on; wherein when the rechargeable battery is not fully charged, the control circuit deactivates the charger and controls the bidirectional converter to convert alternating current of the secondary side of the transformer into direct current; and when the rechargeable battery is fully charged, the control circuit deactivates the bidirectional converter and controls the charger to convert alternating current of the alternating-current input into direct current;

or, when the first threshold voltage is higher than the mains voltage or is higher than or equal to the fourth threshold voltage, the control circuit turns the safety switch off, connects the second switch to the second terminal of the primary side of the transformer, turns the output switch on, and controls the bidirectional converter to convert direct current of the rechargeable battery into alternating current.

9. A control method for the offline uninterruptible power source of claim 2, comprising the following steps: detecting a mains voltage of the alternating-current output, detecting a charging state of the rechargeable battery, controlling working states of the charger and the bidirectional converter according to the mains voltage and the charging state of the rechargeable battery, and controlling states of the safety switch, the first switch, the second switch, the third switch and the output switch according to claim 2.

10. The control method of claim 9, wherein when the mains voltage is greater than or equal to a first threshold voltage and is less than a second threshold voltage, the safety switch is switched on, the third switch is connected to the first switch, the first switch is connected to the tap of the primary side of the transformer, the second switch is connected to the second terminal of the primary side of the transformer, and the output switch is switched on;

wherein when the rechargeable battery is not fully charged, the charger is deactivated and the bidirectional converter is controlled to convert alternating current of the secondary side of the transformer into direct current; and when the rechargeable battery is fully charged, the bidirectional converter is deactivated and the charger is controlled to convert alternating current of the alternating-current input into direct current.

11. The control method of claim 10, wherein when the mains voltage is greater than or equal to the second threshold voltage and less than a third threshold voltage, the safety switch is switched on;

wherein when the rechargeable battery is not fully charged, the third switch is connected to the first switch, the first switch and the second switch are connected to the second terminal of the primary side of the transformer, the output switch is switched on, and the bidirectional converter is controlled to convert alternating current of the secondary side of the transformer into direct current; and when the rechargeable battery is fully charged, the third switch is connected to the second terminal of the alternating-current output, the output switch is switched off, the bidirectional converter is deactivated, and the charger is controlled to convert alternating current of the alternating-current input into direct current.

12. The control method of claim 11, wherein when the mains voltage is greater than or equal to the third threshold voltage and is less than a fourth threshold voltage, the safety switch is switched on, the third switch is connected to the first switch, the first switch is connected to the second terminal of the primary side of the transformer, the second switch is connected to the tap of the primary side of the transformer, and the output switch switched on;

wherein when the rechargeable battery is not fully charged, the charger is deactivated and the bidirectional converter is controlled to convert alternating current of the secondary side of the transformer into direct current; and when the rechargeable battery is fully charged, the bidirectional converter is deactivated and the charger is controlled to convert alternating current of the alternating-current input into direct current.

13. The control method of claim 12, wherein when the mains voltage is less than the first threshold voltage or is greater than or equal to the fourth threshold voltage, the safety switch is switched off, the second switch is connected to the second terminal of the primary side of the transformer, the output switch is switched on, and the bidirectional converter is controlled to convert direct current of the rechargeable battery into alternating current.

* * * * *